US008753167B2

(12) United States Patent
Ganz et al.

(10) Patent No.: US 8,753,167 B2
(45) Date of Patent: *Jun. 17, 2014

(54) PET OF THE MONTH EXCLUSIVE LIMITED TIME REWARDS

(75) Inventors: Howard Ganz, North York (CA); Karl Joseph Borst, Woodbridge (CA)

(73) Assignee: Ganz, Woodbridge, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 13/349,839

(22) Filed: Jan. 13, 2012

(65) Prior Publication Data

US 2012/0116898 A1    May 10, 2012

Related U.S. Application Data

(63) Continuation of application No. 11/857,573, filed on Sep. 19, 2007, now Pat. No. 8,118,636.

(60) Provisional application No. 60/968,260, filed on Aug. 27, 2007.

(51) Int. Cl.
    *G06F 3/00* (2006.01)
(52) U.S. Cl.
    USPC ............................. 446/175; 463/39; 463/42
(58) Field of Classification Search
    None
    See application file for complete search history.

(56) References Cited

U.S. PATENT DOCUMENTS

| 5,411,259 | A  | 5/1995  | Pearson et al.    |
|-----------|----|---------|--------------------|
| 6,251,017 | B1 | 6/2001  | Leason et al.     |
| 6,267,672 | B1 | 7/2001  | Vance             |
| 6,290,565 | B1 | 9/2001  | Galyean, III et al. |
| 6,616,532 | B2 | 9/2003  | Albrecht          |
| 6,663,105 | B1 | 12/2003 | Sullivan et al.   |
| 6,692,360 | B2 | 2/2004  | Kusuda et al.     |
| 6,773,325 | B1 | 8/2004  | Mawle et al.      |
| 6,910,186 | B2 | 6/2005  | Kim               |
| 7,066,781 | B2 | 6/2006  | Weston            |
| 7,081,033 | B1 | 7/2006  | Mawle et al.      |
| 7,155,680 | B2 | 12/2006 | Akazawa et al.    |
| 7,171,154 | B2 | 1/2007  | Fujisawa          |
| 7,191,220 | B2 | 3/2007  | Ohwa              |

(Continued)

FOREIGN PATENT DOCUMENTS

| GB | 2365364      | 2/2002 |
| JP | 2002063092   | 2/2002 |
| WO | 01/02072 A1  | 1/2001 |
| WO | 01/69829 A2  | 9/2001 |

OTHER PUBLICATIONS

Search Report for Application No. PCT/CA2008/001424, filed Aug. 1, 2008.

(Continued)

*Primary Examiner* — Masud Ahmed
(74) *Attorney, Agent, or Firm* — Pearne & Gordon LLP

(57) ABSTRACT

A unique code is used to register a virtual pet or other item using a code that is associated with the pet, and which, when entered, allows viewing and interacting with a virtual representation of the actual item on the website. If the code is entered during a specific time period, it allows obtaining at least one additional item, for example an exclusive item that cannot be obtained in any other way. The specific time period can be extended, e.g., using supplemental codes. The codes may specify fixed or variable time periods, and may be generic extension codes and extend other things other than this period.

30 Claims, 1 Drawing Sheet

(56) References Cited

U.S. PATENT DOCUMENTS

| | | |
|---|---|---|
| 7,249,139 B2 | 7/2007 | Chuah et al. |
| 7,297,063 B2 | 11/2007 | Fujisawa |
| 7,314,407 B1 | 1/2008 | Pearson |
| 7,396,281 B2 | 7/2008 | Mendelsohn et al. |
| 7,478,047 B2 | 1/2009 | Loyall et al. |
| 7,488,231 B2 | 2/2009 | Weston |
| 7,797,168 B2 * | 9/2010 | Kusumoto et al. ............. 705/1.1 |
| 2001/0031603 A1 | 10/2001 | Gabai et al. |
| 2002/0107783 A1 | 8/2002 | La Mura et al. |
| 2003/0018523 A1 | 1/2003 | Rappaport |
| 2004/0030595 A1 | 2/2004 | Park et al. |
| 2004/0043806 A1 | 3/2004 | Kirby |
| 2004/0093266 A1 | 5/2004 | Dohring |
| 2004/0242326 A1 | 12/2004 | Fujisawa |
| 2004/0249712 A1 | 12/2004 | Brown et al. |
| 2005/0059483 A1 | 3/2005 | Borge |
| 2005/0071225 A1 | 3/2005 | Bortolin |
| 2005/0137015 A1 | 6/2005 | Rogers et al. |
| 2005/0177428 A1 | 8/2005 | Ganz |
| 2005/0192864 A1 * | 9/2005 | Ganz .............................. 705/14 |
| 2005/0250415 A1 | 11/2005 | Barthold |
| 2005/0250416 A1 | 11/2005 | Barthold |
| 2006/0079150 A1 | 4/2006 | Filoseta et al. |
| 2006/0093142 A1 | 5/2006 | Schneier et al. |
| 2006/0100018 A1 | 5/2006 | Ganz |
| 2006/0163349 A1 * | 7/2006 | Neugebauer .................. 235/383 |
| 2007/0043620 A1 | 2/2007 | Leason et al. |
| 2007/0130001 A1 | 6/2007 | Jung et al. |
| 2008/0163055 A1 | 7/2008 | Ganz |
| 2008/0221998 A1 | 9/2008 | Mendelsohn et al. |
| 2010/0010887 A1 * | 1/2010 | Karlin et al. ................ 705/14.15 |
| 2011/0035594 A1 * | 2/2011 | Fox ............................... 713/170 |
| 2011/0276377 A1 | 11/2011 | Kim et al. |
| 2012/0084128 A1 * | 4/2012 | Murphy et al. ............ 705/14.15 |

OTHER PUBLICATIONS

Grace, "Web Site Tycoon's Next Goal: Sixth Grade": Woonsocket Call, Jun. 19, 2002.

http://web.archive.org.web.20031202190119/www.monopets.com/, Dec. 2, 2003.

* cited by examiner

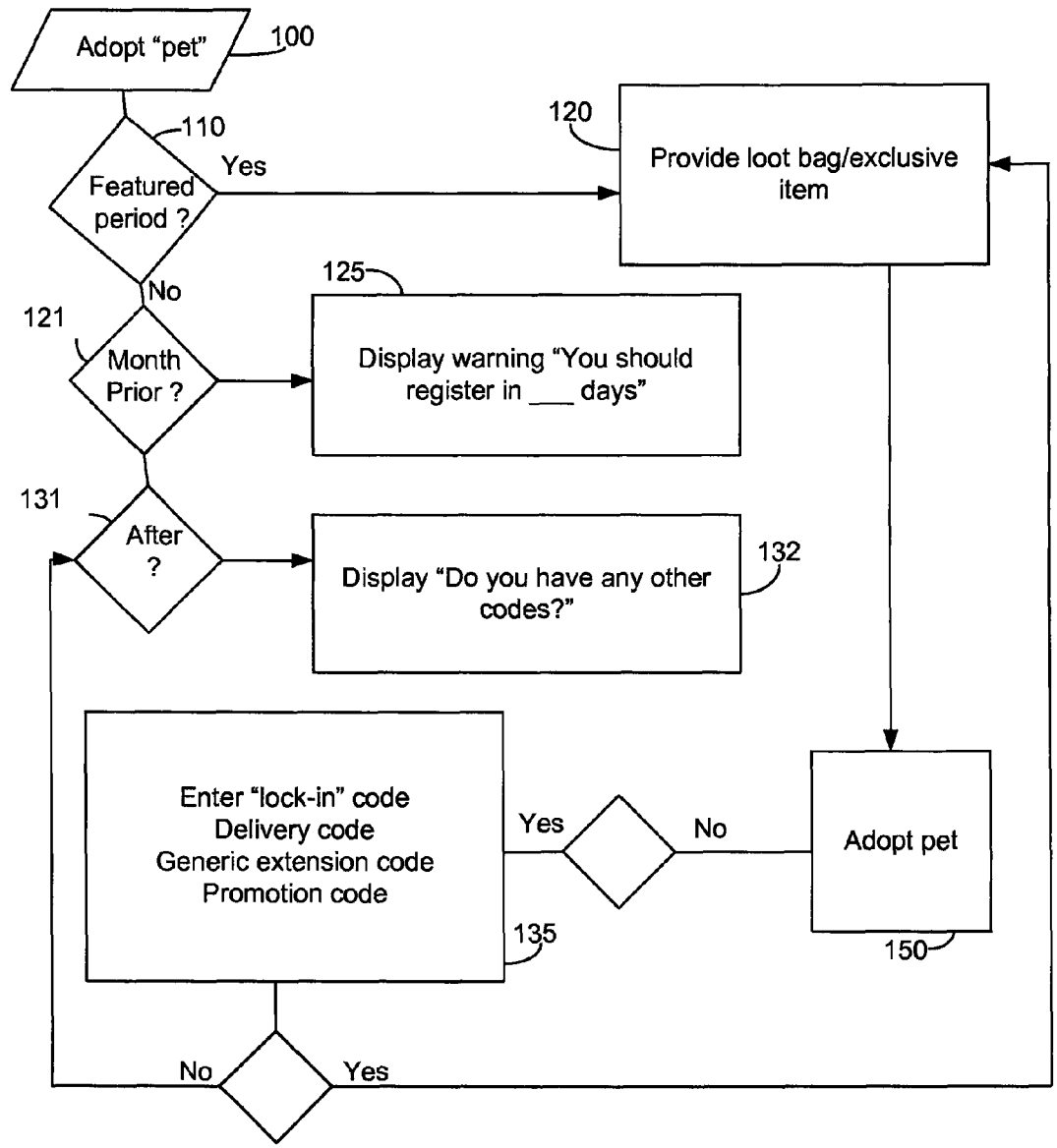

PET OF THE MONTH EXCLUSIVE LIMITED TIME REWARDS

This application claims priority to provisional application No. 60/968,260, filed Aug. 27, 2007, the disclosure of which is hereby incorporated by reference.

BACKGROUND

GANZ markets a product which includes both real-world items, and their virtual replicas. Webkinz® stuffed animals allow obtaining both a stuffed animal or other "pet", and a virtual representation of the pet on a website. Techniques of the website and user interaction are described in patent application publication number 2005-0177428, the subject matter of which is herewith incorporated by reference.

Briefly, a unique registration code is associated with the toy or other item, and that registration code opens content on the website when entered on the website. The content that is opened has an appearance that resembles the toy.

SUMMARY

The present application describes the use of a first code on a website to produce a real-world image of an item associated with the code. That image of the real-world item is displayed on the website. According to an embodiment, that image may be part of a virtual reality representation that virtually shows the real-world item and allows interaction with the real-world item.

According to the present application, special features are obtained on the website associated with at least one additional operation carried out during registration of the first code.

An aspect describes that special features are obtained only when the first code is registered during a specified and limited period of time.

Another aspect describes another code that can be used to extend the period of time in various ways.

Another aspect describes that a special code can be used in place of the registration during the limited period of time.

BRIEF DESCRIPTION OF THE DRAWING

FIG. 1 illustrates a flowchart of operation of the present embodiments, as executed on a computer.

DETAILED DESCRIPTION

An embodiment describes a pet of the month operation which allows special rewards for registration during a limited time. While the embodiment describes pets, it should be understood that items can be any item of any type that is capable of being made in a real-world item, and also displayed "virtually," that is by images or animations on a website. For example, other embodiments may include, in place of pets, dolls, or other items.

A code is included with the real-word item, such as by being printed on a tag or stored in a memory device attached to the real-world item, or providing the code in some other way. The code may be a unique registration code. During an adoption process, the unique registration code is entered, causing an image or other virtual representation of the real-world item with which the registration code is associated being displayed on the website.

Different types of pets are available for adoption, for example black cats, golden retriever dogs, horses, pigs, etc. Each month, one type of the pets that is available for adoption becomes spotlighted. That type of item becomes the pet of the month for that one month (or other limited) period.

According to another embodiment, there may be more than one pet of the month, for example between 1 and 5 pets of the month. Adopting that type of pet during the spotlighted period entitles the adopter to a special online gift or extra item. Different extra items can be provided for adopting a pet during the spotlighted period, for example bonus virtual cash that is available on the website, or a virtual item on the website for the type of pet that may be an exclusive item, available only to people who have adopted that type of pet during the spotlighted period.

FIG. 1 illustrates a flowchart that can be carried out over a computer network such as the Internet. At 100, a user enters the registration code provided with a pet, to "adopt" the pet. 110 tests to determine if the current time is during a period during which the type of pet to which that adopted pet belongs is spotlighted as being the pet of the month. 110 refers to this as the feature period, e.g. a calendar month. If the adoption occurs during the feature period, an extra item, such as an exclusive item for the pet, is provided in addition to the adoption at 120. An embodiment may provide an extra item that is a "loot bag" that includes bonus virtual cash, exclusive items, and/or other items. For example, the exclusive items may be vehicles, animated ponds, and other virtual items that can interact with the adopted pet, existing pets, or others.

The embodiment may announce the next month's pet, some time before the beginning of the following month, for example 10 days ahead or one month ahead. The only thing that matters in order to obtain the extra item is that the adopted pet is of the specified type and is adopted and registered at 100 during the featured month. Accordingly, users can obtain the extra item by purchasing the pet ahead of time, and waiting to register the pet at 100 until the featured month begins.

Retailers can also plan in the same way. This allows the retailers to order the pets ahead of time, in preparation for the month.

A number of aspects may be used to address the issues that may occur that are caused by a limited time offer.

For example, during a period prior to the pet of the month featured period, such as the month before, a warning system may be initiated. 121 detects the user attempting to adopt a pet which is a future pet of the month at a time before the pet of the month is active. A warning may be displayed at 125 indicating that this is a future pet of the month, and indicating when the pet should be registered, for example in 5 days or some other number. This thus reminds the new owner to wait until the proper time, so that they get the extra item. However, if the new owner does not want to wait, the pet can still be registered without the extra time.

Another problem may occur due to the realities of sale. For example, a retailer may be hesitant to buy too many pets, since they have a special value only during a specified time period. For example, if a pet is featured during the month of October, the retailers may buy only that number of pets that they are sure they can sell during the month of October. This may induce the retailers to buy a conservative number of the pets just to be sure that they don't have any left over at the end of October for example.

Another embodiment, therefore, provides an extension mechanism for the feature. 131 detects that the registration is occurring too late for the featured period. 132 then displays a query of whether the user has "any other codes". Additional feature codes, e.g. extension codes, can be used to allow obtaining the features at 120, even after expiration of the period.

One embodiment may provide a lock-in code at 135. For example, adopting the pet at 100 requires entry of a secret code associated with the pet. A second code may be provided to the retailer that is a lock in code that allows the pet to be adopted even after the feature period has elapsed. These second codes may be provided to the retailer, for example, on request of the retailer after the featured period has elapsed. The lock in codes may be specific to pet x, featured during month y. For example, if the retailer has 10 items left at the end of the featured period, they can request 10 lock-in codes for that item. The lock-in codes may be usable for a specified period of time, for example one month or three months. The lock-in code bypasses the expiration of the featured period and allows the user to obtain extra items for the pet at 120 as though it were during the feature period.

A delivery code may be provided when the items are bought through an e-commerce retailer. The concern would otherwise be that the time for delivery causes the user to receive the item after the feature period has ended. Items which are sent via e-commerce may have a delivery code included that extends the feature time (again for any specific pet) by an amount of time that is typical for a delivery. The delivery code can include for example, an extension for the specified time to allow delivery via a common carrier, for example two weeks.

Another embodiment uses generic extension codes. A generic extension code can be used for extending any limited time period for any item that will be registered on the website. For example, by entering a generic extension code, any expired operation on the website is automatically extended by the length of time specified by the extension code. In this way, retailers (or e-commerce purchasers) can be provided with some number of 30 day generic extension codes that they can give to any purchaser of any item. The retailers can include an extension code with any pet of the month that they sell later than that featured month. The extension codes allow the user to adopt the pet as though it were during the feature period, even after the feature period has elapsed. Unlike the lock-in codes, and delivery codes, the extension codes may be good for any pet.

A promotion code is an alternative code that can be given out to various users and/or sellers, and enable obtaining the reward at 120 independent of purchase of any pet, or of time. For example, in one embodiment, the promotion code may be given out to retailers, who are encouraged to give a promotion code with the purchase of three Webkinz® items. The promotion code is unlike the lock-in and delivery codes, since it provides the user with rewards independent of any item purchase. It is not an extension code, since it does not require any other code to extend. The promotion code allows the extra item at 120 to be obtained independent of adopting any pet/item, so long as the promotion code is entered.

The promotion code in general will not have a limited time during which it is usable (such as the period in 110). For housekeeping issues, however, the promotion code may have an expiration date to prevent someone attempting to use that code years in the future.

In general, any of the codes that are entered at 135 allow obtaining the extra item at 120. After all of these codes have been entered, the adoption is continued at 150 where the pet is adopted and added to the user's group of pets that can be used on the website. The items obtained at 120 are also added to the user's stored items.

For all of these embodiments described with reference to FIG. 1, the user enters a secret code which is used for registration of the pet/item and also to adopt the pet/item 150, obtain a virtual image of the pet, and allow interaction with the pet. The user also enters a feature code that gives the user other features, other than adoption of the pet/item. The embodiments disclosed above describe how the feature code can be specific to a specific pet, can have a limited time during which it can be used, or other.

During the period, e.g. a month, where a specified item becomes a featured item, e.g., where a pet becomes the Pet of the Month, other rewards may also be obtained. Any user who has such a pet registered on the site during the Pet of the Month period, even if that user did not register the pet in that month, may be afforded additional or exclusive activities. For example, users who have previously registered items that are now Pets of the Month, may be given additional activities, e.g., extra spins on a reward wheel (e.g., the Wheel of Wow™), or be eligible for drawings for rare items. The items that are given to those who have already registered the pets may be different than, or the same as, items given to those who register the pets during the time period.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other items can be "adopted" and other kinds of extension codes and paradigms can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The operation of the flowchart is carried out by computers, which may be any kind of computer, either general purpose, or some specific purpose computer such as a workstation or dedicated server. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:

accepting a registration code that is associated with a real-world item to allow registration of the real-world item on a website;

responsive to said registration of said real-world item on said website, providing at least one image representing the real-world item on the website;

determining if said registration has been accepted during a specified and limited time period; and if said registration was accepted during said specified and limited time period, providing at least one extra item on the website, wherein said at least one extra item is associated with and capable of interacting with the at least one image representing the real-world item on the website.

2. A method as in claim 1, wherein said at least one extra item is an item that cannot be obtained in any other way other than by registering said registration code during said specific and limited time period.

3. A method as in claim 1, wherein said specific and limited time period is one specific calendar month.

4. A method as in claim 1, wherein said providing said at least one extra item is responsive to a determination that the real-world item is of a type that is designated to correspond to said specified and limited time period.

5. A method as in claim 1, further comprising entering an additional code as part of said registration which allows obtaining said at least one extra item outside of said specific and limited time period.

6. A method as in claim 5, wherein said additional code comprises a code that extends said specific and limited time period by a fixed amount of time.

7. A method as in claim 5, wherein said additional code comprises a code that extends said specific and limited time by an amount of time necessary for delivery by a carrier.

8. A method as in claim 5, wherein said additional code comprises a code that extends plural different expiration dates on said website.

9. A method as in claim 5, further comprising allowing said additional code to obtain said at least one extra item at any time.

10. A method as in claim 1, further comprising detecting that the registration was entered outside the specified and limited time period, and providing a warning to a user indicative thereof.

11. A method, comprising:

providing a real-world item to a user that is associated with a unique registration code;

allowing the user to enter the unique registration code into a website, and allowing the user to view and interact with a virtual representation of the real-world item on the website responsive to the entry of the unique registration code; and providing at least one extra item on the website that is usable with said virtual representation and can interact with said virtual representation, if said user enters said unique registration code during a specified and limited time period.

12. A method as in claim 11, further comprising allowing the user to take an action which extends said specified and limited time period.

13. A method as in claim 12, wherein said action is entry of a lock in code which is specific only for said action and only for a specified period of time.

14. A method as in claim 12, wherein said action is entry of a delivery code that is specific for said action, and for a period of time enabling an item to be shipped to the user.

15. A method as in claim 12, wherein said action is entry of a generic extension code that allows either said specified and limited period to be extended or at least one other period on said website to be extended.

16. A method as in claim 11, further comprising allowing the user to enter a promotion code which provides said at least one extra item during a time outside said specified and limited period.

17. A method as in claim 11, further comprising determining if said real world item has already been registered prior to said specified and limited time period, and providing at least one extra item based on said determining.

18. A computer readable medium encoded with a computer programs to cause a machine to:

accept a registration code that is associated with a real-world item to allow registration of that item on a website;

responsive to said registration of said item on said website, provide at least one virtual representation of the real-world item on the website and allow interaction with said at least one virtual representation;

determine if said registration has been accepted during a specified and limited time period; and if said registration was accepted during said specified and limited time period, provide at least one extra item on the website that is usable with said at least one virtual representation and can interact with said at least one virtual representation.

19. A medium as in claim 18, further comprising instructions to allow a user to take an action which extends said specified and limited time period.

20. A medium as in claim 19, wherein said instructions comprise instructions to allow entry of a lock in code which is specific only for said action and only for a specified period of time.

21. A medium as in claim 19, wherein said instructions comprise instructions to allow entry of a delivery code that is specific for said action, and for a period of time enabling an item to be shipped to the user.

22. A medium as in claim 19, wherein said instructions comprise instructions to allow entry of a generic extension code that allows either said specified and limited period to be extended or at least one other period on said website to be extended.

23. A medium as in claim 18, further comprising instructions to allow a user to enter a promotion code which provides said at least one extra item during a time outside said specified and limited period.

24. An apparatus comprising, comprising:

a server computer, accepting a registration code that is associated with a real-world item to allow registration of the real-world item on a website, said server operating responsive to said registration of said real-world item on said website, providing at least one image representing the real-world item on the website;

said server including a time determining element, and operating for determining if said registration has been accepted during a specified and limited time period set by said time determining element, if said registration was accepted during said specified and limited time period, providing at least one extra item on the website, wherein said at least one extra item is associated with and capable of interacting with the at least one image representing the real-world item on the website, and where said at least one extra item is not provided if said registration was accepted outside said specified and limited time period.

25. The apparatus as in claim 24, wherein said at least one extra item is an item that cannot be obtained in any other way other than by registering said registration code during said specific and limited time period.

26. The apparatus as in claim 24, wherein said specific and limited time period is one specific calendar month.

27. The apparatus as in claim 24, wherein said providing said at least one extra item is responsive to a determination that the real-world item is of a type that is designated to correspond to said specified and limited time period.

28. The apparatus as in claim 24, further comprising entering an additional code as part of said registration which allows obtaining said at least one extra item outside of said specific and limited time period.

29. The apparatus as in claim 28, wherein said additional code comprises a code that extends said specific and limited time period by a fixed amount of time.

30. The apparatus as in claim 24, further comprising detecting that the registration was entered outside the specified and limited time period, and providing a warning to a user indicative thereof.

* * * * *